US012762607B2

(12) United States Patent
Moulin et al.

(10) Patent No.: US 12,762,607 B2
(45) Date of Patent: Oct. 13, 2026

(54) SYSTEM FOR DELIVERING AN ORDER AT A PICK-UP POINT

(71) Applicant: EXOTEC PRODUCT FRANCE, Croix (FR)

(72) Inventors: Romain Moulin, Lille (FR); Renaud Heitz, Villeneuve D'Ascq (FR); Marc Chatain, Zimmerbach (FR)

(73) Assignee: EXOTEC PRODUCT FRANCE, Croix (FR)

( * ) Notice: Subject to any disclaimer, the term of this patent is extended or adjusted under 35 U.S.C. 154(b) by 261 days.

(21) Appl. No.: 18/245,811

(22) PCT Filed: Sep. 20, 2021

(86) PCT No.: PCT/EP2021/075834
§ 371 (c)(1),
(2) Date: Mar. 17, 2023

(87) PCT Pub. No.: WO2022/058596
PCT Pub. Date: Mar. 24, 2022

(65) Prior Publication Data

US 2024/0005384 A1 Jan. 4, 2024

(30) Foreign Application Priority Data

Sep. 18, 2020 (EP) .................................... 20197079

(51) Int. Cl.
*G06Q 10/0836* (2023.01)
*E04H 1/12* (2006.01)
(Continued)

(52) U.S. Cl.
CPC ....... *G06Q 30/0635* (2013.01); *E04H 1/1205* (2013.01); *G06K 7/1417* (2013.01); *G06Q 10/0836* (2013.01)

(58) Field of Classification Search
None
See application file for complete search history.

(56) References Cited

U.S. PATENT DOCUMENTS 3,647,026 A 3/1972 Alexander et al.
7,054,832 B1 5/2006 Vallabh
(Continued)

OTHER PUBLICATIONS

Mirolla, M., "First Person", The Gazette [Montreal, Quebec], Final Edition, Apr. 10, 1988: D2. (Year: 1988).*
(Continued)

*Primary Examiner* — Nicholas D Rosen
(74) *Attorney, Agent, or Firm* — David D. Brush; Westman, Champlin & Koehler, P.A.

(57) ABSTRACT

A system for automatic delivery of orders ordered online near a trunk of a vehicle at a pick-up point having a plurality of order picking stations. Each station has associated therewith a motor vehicle access and parking lane having a first parking space and a second parking space placed behind the first space. The pick-up point includes, for each order picking station, a first and a second 2-dimensional bar code visible from the first or second parking space and/or first and second signalling elements for signalling the request for delivery of an order located in an immediate vicinity of the first and second parking space and/or a detector for detecting the presence of a customer in the vicinity of the first and second parking space.

19 Claims, 2 Drawing Sheets

(51) Int. Cl.

| | |
|---|---|
| ***G06K 7/14*** | (2006.01) |
| ***G06Q 30/0601*** | (2023.01) |

(56) References Cited

U.S. PATENT DOCUMENTS

| | | | | |
|---|---|---|---|---|
| 7,895,797 | B2 * | 3/2011 | Bridgman | E04H 14/00 52/33 |
| 9,373,044 | B2 * | 6/2016 | Wallat | B62D 15/025 |
| 10,373,226 | B1 * | 8/2019 | Russell | G06Q 30/0635 |
| 10,373,496 | B2 * | 8/2019 | Koreishi | G08G 1/168 |
| 10,482,421 | B1 * | 11/2019 | Ducrou | G06V 20/54 |
| 10,640,357 | B2 * | 5/2020 | Burks | G06Q 20/326 |
| 10,803,423 | B2 * | 10/2020 | Baker, Sr. | H04L 67/01 |
| 11,113,841 | B1 * | 9/2021 | Zelenskiy | G06T 7/74 |
| 11,182,864 | B1 * | 11/2021 | Fox | G06Q 30/0641 |
| 11,281,172 | B1 * | 3/2022 | Kalm | B65B 43/42 |
| 2009/0255195 | A1 * | 10/2009 | Bridgman | E04H 14/00 52/741.1 |
| 2013/0104035 | A1 * | 4/2013 | Wagner | G06F 16/29 715/240 |
| 2014/0114778 | A1 | 4/2014 | Miller et al. | |
| 2014/0132389 | A1 * | 5/2014 | Choi | G06K 7/146 340/5.1 |
| 2014/0176716 | A1 * | 6/2014 | Wallat | B60W 30/12 348/148 |
| 2016/0244311 | A1 * | 8/2016 | Burks | B67D 1/0888 |
| 2017/0018148 | A1 * | 1/2017 | Behm | G06Q 20/20 |
| 2018/0089631 | A1 * | 3/2018 | Baker, Sr. | G06Q 10/087 |
| 2018/0276992 | A1 * | 9/2018 | Koreishi | G08G 1/168 |
| 2019/0097650 | A1 * | 3/2019 | Willner | H03M 7/4043 |
| 2019/0205468 | A1 * | 7/2019 | Barnes, Jr. | G06F 16/635 |
| 2019/0377360 | A1 * | 12/2019 | Kim | H04W 4/024 |
| 2020/0043330 | A1 * | 2/2020 | Meng | G08G 1/082 |
| 2020/0250989 | A1 * | 8/2020 | Amacker | G08G 1/0112 |

OTHER PUBLICATIONS

Anon., "Stacked Parking Co. provides unintended benefits," University Wire [Carlsbad] Feb. 24, 2014. (Year: 2014).*

English translation of the Written Opinion of the International Searching Authority dated Apr. 21, 2022 for corresponding International Application No. PCT/EP2021/075834, filed Sep. 20, 2021.

International Search Report dated Apr. 21, 2022 for corresponding International Application No. PCT/EP2021/075834, filed Sep. 20, 2021.

Written Opinion of the International Searching Authority dated Apr. 21, 2022 for corresponding International Application No. PCT/EP2021/075834, filed Sep. 20, 2021.

Sharma Ajit et al., "Drive Through Robotics: Robotic Automation for Last Mile Distribution of Food and Essentials During Pandemics", IEEE Access, IEEE, USA, vol. 8, Jul. 6, 2020 (Jul. 6, 2020), p. 127190-127219 XP011800122.

Anonymous, "Station Car Parking Good Practice Guide Station Car Parking Good Practice Guide", Feb. 1, 2018 (Feb. 1, 2018), p. 1,44,48, Retrieved from the Internet: URL:https://www.raildeliverygroup.com/media-centre-docman/123-2018-02-station-car-parking-guide/file.html, XP055865286.

Ryan Tom, "Walmart expands test of pickup-only grocery store concept", Oct. 1, 2018 (Oct. 1, 2018), p. 1-1, Retrieved from the Internet: URL:https://www.retailwire.com/discussion/walmart-expands-test-of-pickup-only-grocery-store-concept/, XP055865363.

Charlton Graham, "Asda (Drive-thru photo)", Aug. 31, 2016 (Aug. 31, 2016), p. 1-1, Retrieved from the Internet: URL:https://www.clickz.com/how-will-amazon-affect-the-future-of-the-uk-grocery-industry/105386/asda-4/, XP055865467.

European Notification under Article 71(3) EPC dated Sep. 19, 2025 for corresponding European Application No. 21 782 492.9.

Hofbauer R., "Walmart Tests Online Grocery Pickup for EPT Users," Progressive Grocer Advertisement, Sep. 19, 2017, XP55865333.

Bender M., "Piloting Delivery with Uber, Lyft and Deliv," Walmart Article, Jun. 3, 2016, XP55865346.

* cited by examiner

SYSTEM FOR DELIVERING AN ORDER AT A PICK-UP POINT

1. CROSS-REFERENCE TO RELATED APPLICATIONS

This Application is a Section 371 National Stage Application of International Application No. PCT/EP2021/075834, filed Sep. 20, 2021, which is incorporated by reference in its entirety and published as WO 2022/058596 A2 on Mar. 24, 2022, not in English.

2. FIELD OF THE INVENTION

The field of invention is that of logistics in shops providing an order delivery service at pick-up point, also known as "Drive-through".

More specifically, the invention relates to a system for delivering an order at a pick-up point.

The invention is particularly applicable to the removal of food or consumer products at pick-up points.

3. STATE OF THE ART

It is known in shops offering order delivering service at pick-up point, also called "drive-through service", where one or more pickers store the items of a collected order in bags on shelves, waiting for the customer to pick up the order. The sorting of the items in an order can be carried out during the collection round or when the order is put on the shelf.

This technique of preparing an order has many disadvantages. It requires a lot of manpower. In addition, with this known technique, a customer who comes to collect his order may have to wait for a certain length of time, the time it takes for a picker to collect his order from the shelves and deliver it to him, or in the event that all the pickers are busy carrying out a collection round and are not available to deliver his order.

In order to limit the waiting time of the customers, it was thought to implement automated delivery tracks of the order items from a buffer storage facility, also automated, which allow to hand over the order to a customer automatically as soon as the customer signals his presence on a kiosk of the pick-up point.

With this known technique, however, it takes about 2-3 minutes to collect the items in the order and deliver them to the pick-up point. The customer's vehicle thus remains parked at the pick-up point for a total of about 5-6 minutes, plus the time required for the customer to load the items into his vehicle, which limits the number of customers that can be delivered per hour at a pick-up point to 10-12 with this known technique.

In order to increase the number of customers that can be delivered per hour at a pick-up point, it was thought to implement additional terminals at the entrance to the car parks of the shops, allowing each customer to signal his arrival before he goes to the pick-up point, so that he can start collecting the items of his order stored in the buffer storage facility and bring them from the buffer storage to the pick-up point as soon as the customer enters the car park.

However, this known technique allows for a relatively small increase in the number of customers that can be delivered per hour (of the order of 20% at most), as the time required to cover the distance between the entrance to the car park and the pick-up point is generally quite short, and most often less than 1 minute.

4. SUMMARY

An exemplary aspect of the present disclosure relates to a system for the automatic delivery of orders ordered online near the trunk of a vehicle comprising:

- a pick-up point with a plurality of order picking stations, each of which is associated with an access and parking lane for a motor vehicle, adjacent to it;
- an automated buffer storage facility for ordered items;
- means for automated routing of said stored items from said buffer storage facility to said order picking stations,
- an order delivery management unit able to order the collection of the items of an order in said buffer storage facility and to control the activation of the means of routing said items.

According to the invention, each access lane comprises a first space and a second space for parking vehicles, said second space being placed behind said first space in said lane, and said pick-up point comprises, for each order picking station:

- a first 2-dimensional bar code visible from said first parking space comprising information identifying said order picking station and/or first means for signalling the request for delivery of an order located in the immediate vicinity of said first parking space and/or means for detecting the presence of a customer having placed an order in the vicinity of said first parking space
- a second 2-dimensional bar code visible from said second parking space comprising information identifying said order picking station and/or second means for signalling the request for delivery of an order located in the immediate vicinity of said second parking space and/or means for detecting the presence of a customer having placed an order in the vicinity of said second parking space, and said order delivery management unit is configured so that either when said first or said second two-dimensional bar code is scanned by a customer having placed an order by means of a dedicated application downloadable on a terminal of said customer able to transmit a signal to said management unit comprising an identification information of said order and said identification information of said order picking station contained in said first or said second bar code, either when a request for delivery of an order is signalled by said first or said second signalling means or when the presence of a customer of an order is detected in the vicinity of said first or said second parking space, said management unit generates instructions for controlling the activation of the collection, within said buffer storage facility, of the items of the signalled order or of the order of the customer having scanned one of said bar codes or of the order of the customer having been detected in the vicinity of a parking location and instructions for controlling the routing of said items by said routing means to the order picking station associated with said first bar code or with said second bar code having been scanned by said customer or with said first or said second signalling means having notify a request for delivery of the order of said customer or with the access lane where the presence of said customer has been detected if said items are present within said buffer storage facility.

Thus, in a new way, the invention proposes to implement, per order picking station of a pick-up point, two bar codes and/or two means of signalling a request for the delivery of an order and/or means of detecting the presence of a customer at two different parking spaces, in order to increase the number of delivery of orders per hour at each picking station.

The inventors have thus found that with the invention, it was possible to increase the number of orders handed over per hour at the pick-up point by more than 60% compared to known techniques for handing over an order at a pick-up point, for the same number of picking stations.

In a particular embodiment of the invention, said first signalling means and/or said second signalling means comprise a terminal.

Preferably, said first signalling means and said second signalling means are 5 to 10 metres apart.

Advantageously, said access and parking lanes are arranged in a herring-bone pattern and form an angle of 30 to 50° with a service road of said pick-up point.

In particular embodiments of the invention, said first signalling means and/or said second signalling means comprise at least one signalling element from the group comprising at least:

- bar code reader;
- QR code reader;
- magnetic strip or chip reader;
- numeric keypad for entering a code;
- biometric identification reader, such as a fingerprint reader.

In particular embodiments of the invention, said means for detecting the presence of a customer having made an order in the vicinity of said first parking space and/or said means for detecting the presence of a customer having made an order in the vicinity of said second parking space comprise at least one detection element belonging to the group comprising at least:

- presence sensor;
- geolocation system;
- license plate recognition device.

In an advantageous embodiment of the invention, said pick-up point comprises, for each access and parking lane, means for signalling the number of vehicles parked in said access and parking lane.

According to a particular aspect of the invention, said means for signalling the number of vehicles parked in an access and parking lane comprise a traffic light.

In an advantageous embodiment of the invention, as said stored items are delivered in bins to said picking stations, at least one of said picking stations comprises means for transferring empty bins to said automated conveying means.

The invention also relates to a method for automatically delivering orders ordered in-line near the trunk of a vehicle in a pick-up point having a plurality of order picking stations, each of which has associated therewith a motor vehicle access and parking lane adjacent thereto, each access lane comprises a first location and a second vehicle parking space, said second space being located behind said first space in said lane, said pick-up point being associated with:

- an automated buffer storage facility for items that have been the subject of an order;
- automated routing means for said stored items from said buffer storage facility to said picking stations,
- an order delivery management unit capable of ordering the collection of the items of an order in said buffer storage facility and of controlling the activation of the routing means for said items;
- said pick-up point comprising, for each order picking station:
- a first 2-dimensional bar code visible from said first parking space comprising information identifying said order picking station and/or first means for signal-ling the request for delivery of an order located in the immediate vicinity of said first parking space and/or means for detecting the presence of a customer who has placed an order in the vicinity of said first parking space;
- a second 2-dimensional bar code visible from said second parking location comprising information identifying said order picking station and/or second means for signalling the request for delivery of an order located in the immediate vicinity of said second parking space and/or means for detecting the presence of a customer having placed an order in the vicinity of said second parking space, said method comprising the following steps:

- scanning by a customer who has placed an order of said second two-dimensional bar code by means of a dedicated application downloadable onto a terminal of said customer capable of transmitting a signal to said management unit comprising information identifying said order and said information identifying said order picking station contained in said second bar code or notify a request for delivery of an order by means of said second signalling means or detecting the presence of a customer in the vicinity of said second parking space;
- from said scanning or notification or said detection, generating by said management unit instructions to activate the collection, within said buffer storage facility, of the items of the signalled order or of the order of the customer having scanned one of said bar codes or of the order of the having been detected in the vicinity of a parking space and instructions for controlling the routing of said items by said routing means to the picking station associated with said second bar code having been scanned by said customer or associated with said second signalling means having notified a request for delivery of the order of said customer or associated with the access lane where the presence of said customer has been detected
- scanning by the same customer of said first two-dimensional bar code by means of said dedicated application downloadable on a terminal of said customer capable of transmitting a signal to said management unit comprising an identification information of said order and said identification information of said order picking station contained in said first bar code or notifying a request for delivery of the order of said customer by means of said first signalling means or detecting the presence of the same customer in the vicinity of said first parking space;
- delivery of the order items to said picking station associated with said first bar code having been scanned by said customer or associated with said first signalling means having notified a request for delivery of the order of said customer or associated with the access lane where the presence of said customer has been detected.

5. LIST OF FIGURES

Other features and advantages of the invention will become clearer from the following description of two embodiments of the invention, given merely as illustrative and non-limiting examples, and of the appended figures, among which:

6. DETAILED DESCRIPTION OF THE INVENTION

Figure 1:
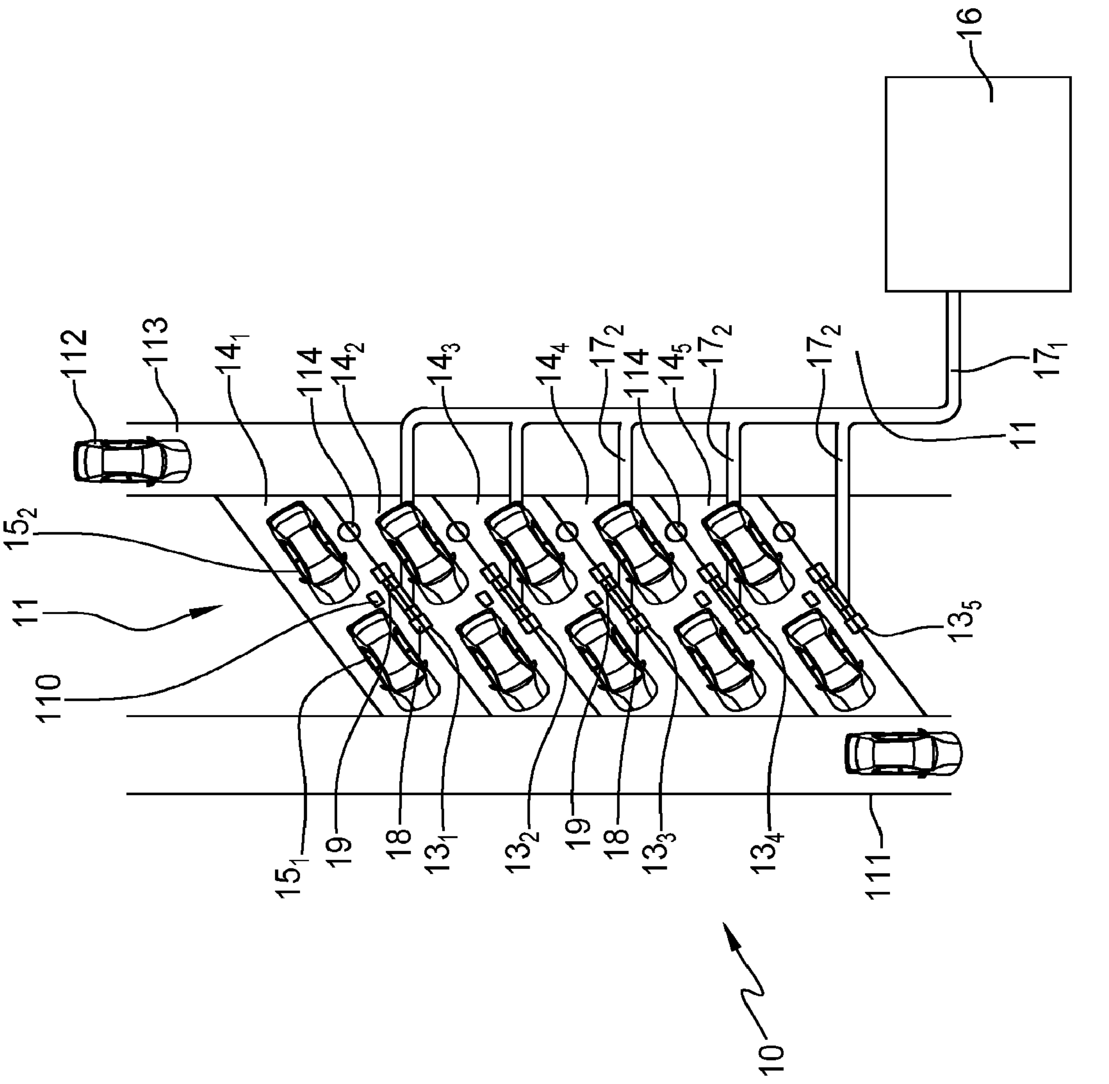
FIG. 1 is a schematic top view of an example of an embodiment of an order delivery system according to the invention.

FIG. 1 illustrates an example of an embodiment of an order delivery system 10 according to the invention at a pick-up point of a retail shop.

This pick-up point 11 is located close to a storage warehouse 12 adjoining the sales area of the shop and has, in this particular embodiment of the invention, five parallel order-picking stations $\mathbf{13}_1$ to $\mathbf{13}_5$ which are accessed by car via five access and temporary parking lanes $\mathbf{14}_1$ to $\mathbf{14}_5$, in a herringbone pattern, each associated with a picking station 13.

Each of the lanes $\mathbf{14}_1$ to $\mathbf{14}_5$ is sized to accommodate two motor vehicles $\mathbf{15}_1$, $\mathbf{15}_2$ one behind the other.

The individual items in an order are delivered to the pick stations $\mathbf{13}_1$ to $\mathbf{13}_5$ in bins from a buffer storage facility (not shown in FIG. 1), where these items have been temporarily stored, via a main conveying overhead track $\mathbf{17}_1$ which divides into five secondary overhead tracks $\mathbf{17}_2$, the end of which opens onto an article delivery column at a picking station $\mathbf{13}_1$, $\mathbf{13}_2$, $\mathbf{13}_3$, $\mathbf{13}_4$ or $\mathbf{13}_5$.

When a first customer 110 of the shop, who has previously placed an online order via the Internet, parks in a lane $\mathbf{14}_1$, $\mathbf{14}_2$, $\mathbf{14}_3$, $\mathbf{14}_4$ or $\mathbf{14}_5$ free of any vehicle and reports to a first terminal 18 equipped with a picking station, for example by entering a code on a screen or a keyboard, or by scanning a bar code corresponding to his order, which has been transmitted to him on his smartphone using a bar code reader on the terminal 18, the order delivery management computer unit of the system 10 then commands robots in the storage facility (not shown in FIG. 1) to pick the items of his order from the storage shelves of the buffer facility and trans-port them to a transfer station where they are deposited on the main conveyor track $\mathbf{17}_1$. The order items are then transported on the main conveyor track and distributed on the secondary conveyor track $\mathbf{17}_2$ allocated to the picking station $\mathbf{13}_1$, $\mathbf{13}_2$, $\mathbf{13}_3$, $\mathbf{13}_4$ or $\mathbf{13}_5$ where the customer has reported for delivery of his order. The bins containing the items of the order are transferred successively from the secondary lane $\mathbf{17}_2$ into a lift, which deposits them on an order delivery table, where the customer can pick up the items of his order to deposit them in the trunk of his vehicle $\mathbf{15}_1$.

A second signalling terminal 19 is located at the level of each picking station $\mathbf{13}_1$ to $\mathbf{13}_5$, upstream of the first terminal 18, with respect to the direction of traffic of the access road $\mathbf{14}_1$, $\mathbf{14}_2$, $\mathbf{14}_3$, $\mathbf{14}_4$ or $\mathbf{14}_5$ associated with this picking station. This second terminal 19 is, in this particular embodiment of the invention, spaced from the first terminal 18 by a distance substantially equal to the length of a parking space.

When a second customer parks his vehicle $\mathbf{15}_2$ on the same access lane as the first customer's vehicle $\mathbf{15}_1$, behind the first customer, waiting for the first customer to leave, he signals his presence on the second terminal 19, for example by entering a code, or by scanning a bar code, corresponding to his order. The system's order delivery management computer unit 10 then commands robots in the storage facility to pick the second customer's order items from the buffer facility's storage shelves and transport them to a transfer station where they are deposited on the main conveyor track $\mathbf{17}_1$. The order items are then transported to the main conveyor track and distributed to the secondary conveyor track $\mathbf{17}_2$, where they are put on hold. When the first customer has finished loading his order into his vehicle and leaves the access lane $\mathbf{14}_1$, $\mathbf{14}_2$, $\mathbf{14}_3$, $\mathbf{14}_4$ or $\mathbf{14}_5$ to join the exit lane 111, the second customer moves his vehicle forward to the level of the first terminal 18 and signals his presence again at the level of the terminal 18, the articles of his order which are waiting on the secondary conveyor track $\mathbf{17}_2$ are directly handed over to him in succession on the order delivery table. He can then pick them up and load them into the trunk of his vehicle $\mathbf{15}_2$. It is easy to understand that the use of the two terminals 18 and 19 makes it possible to increase the number of orders that can be handed over per hour at each picking station $\mathbf{13}_1$ to $\mathbf{13}_5$, because the routing to the picking station of the articles of the customer who is waiting for the order of the customer who precedes him to be handed over to him begins as soon as the latter signals himself at the second terminal 19.

It should also be noted that to facilitate the placement of vehicles in the access lanes, each vehicle 112 that enters the service lane 112 is directed to a free pick-up station by means of traffic lights 114 placed at the entrance to each access lane $\mathbf{14}_1$ to $\mathbf{14}_5$. Thus, for example, a red light indicates that two motor vehicles are already parked on the driveway, an amber light indicates that only one vehicle is parked on the driveway and a green light indicates that the driveway is clear of vehicles.

Figure 2:
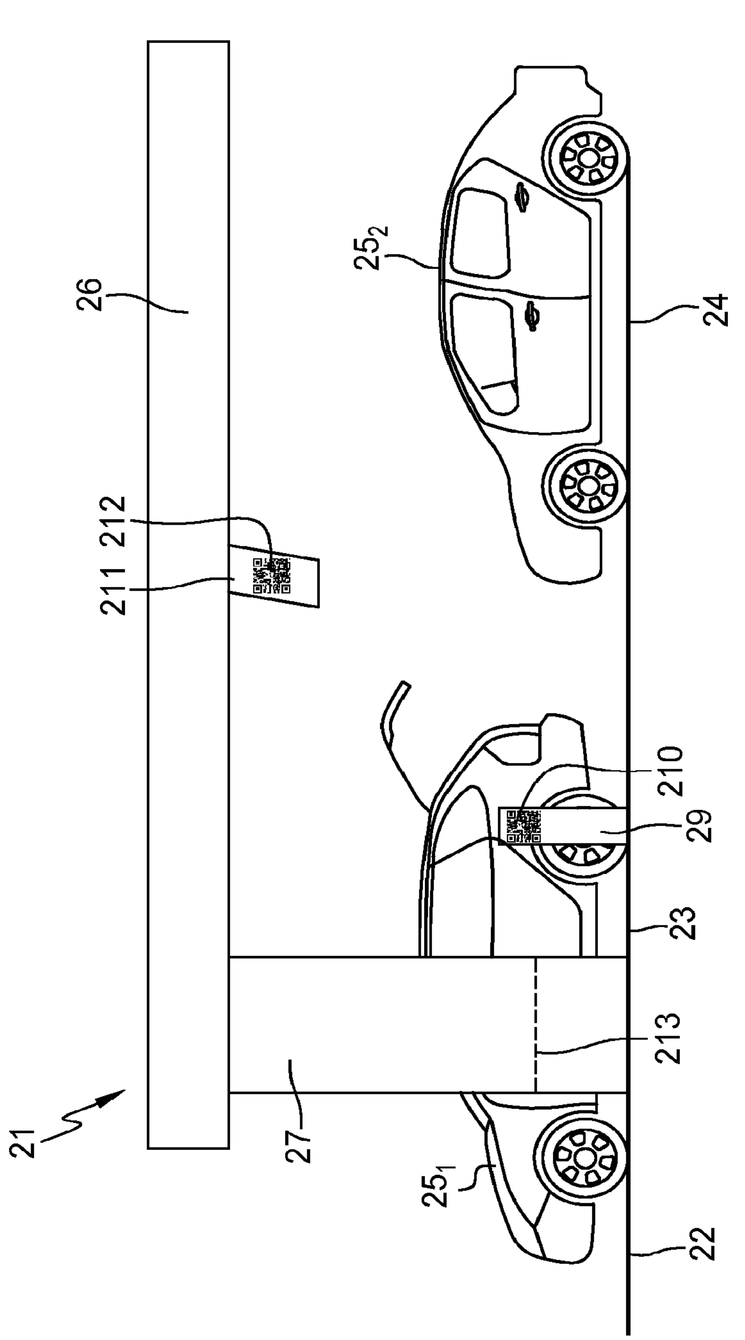
FIG. 2 is a side view of an order picking station of another example of an embodiment of an order delivery system according to the invention.

FIG. 2 shows a picking station 21 of another example of an embodiment of an order delivery system according to the invention, in side view.

This sampling station is adjacent to an access and parking lane 22 with a first parking space 23 and, to the rear of this, a second parking space 24, on which two vehicles $\mathbf{25}_1$ and $\mathbf{25}_2$ are parked, in the situation shown in FIG. 2.

This picking station 21 comprises an order delivery table 213 on which customer order items are deposited from a buffer storage area, routed via a secondary overhead conveyor track 26, the end of which opens onto a delivery column 27. It also comprises, at the level of the first parking space 23, a terminal 29 on which is displayed or printed a QR-code 210 comprising information representative of the picking station 21 and at the front end of the second parking space 24, a panel 211 at height on which is displayed a second QR-code 212 comprising information representative of the picking station 21, which in this particular embodiment of the invention is identical to the first QR-code 210.

Thus, when the vehicle $\mathbf{25}_2$ parks in the second parking space 24 while waiting for the vehicle $\mathbf{25}_1$ to leave the first parking space 23, one of its occupants can scan the second QR-code with his smartphone without getting out of his vehicle by means of a dedicated application that he has downloaded. This application then generates a message to the order handover management module of the pick-up point containing information identifying his order and information identifying the pick-up station 21, which immediately triggers the routing of the items in his order to the pick-up station 21 through the lane 26. As soon as the vehicle $\mathbf{25}_1$ leaves the first parking space 23, the vehicle $\mathbf{25}_2$ can then move forward to the first parking space and an occupant of the vehicle $\mathbf{25}_2$ only needs to scan the second QR-code 212 on the terminal 211 with the dedicated application when going to open the trunk of the vehicle, so that the articles of the order, already routed to the picking station, are delivered to the order delivery table 213. A very short time therefore elapses bet-ween the moment when the second QR-code 212 is scanned and the moment when an occupant of the vehicle $25_2$ can load the items of his order into the trunk of the vehicle $25_2$.

One or more exemplary embodiments of the present disclosure overcomes one or more of the above-mentioned drawbacks of the state of the art.

More specifically, an exemplary embodiment provides a pick-up point order delivery technique that significantly increases the number of customers to whom an order can be delivered per hour at an order picking station of a pick-up point.

An exemplary embodiment provides such a technique that enables at least 20 orders per hour to be handed out per order picking station.

An exemplary embodiment provides such a simple to implement order delivery technique.

An exemplary embodiment provides such a technique at a reduced cost.

Although the present disclosure has been described with reference to one or more examples, workers skilled in the art will recognize that changes may be made in form and detail without departing from the scope of the disclosure and/or the appended claims.

The invention claimed is:

1. A system for automatic delivery of orders ordered in line near a trunk of a vehicle comprising:

a pick-up point having a plurality of order picking stations, each of which is associated with an access and parking lane for a motor vehicle, adjacent thereto;

an automated buffer storage facility of ordered items;

an automated router which routes said stored items from said buffer storage facility to said picking stations; and an order delivery management unit configured to order collection of the ordered items of an order in said buffer storage facility and to control activation of the router, wherein:

each access lane comprises a first vehicle parking space and a second vehicle parking space, said second space being placed behind said first space in said lane, and wherein said pick-up point comprises, for each order picking station:

a first 2-dimensional bar code visible from said first parking space comprising information identifying said order picking station and/or a first signalling element for signalling a request for delivery of an order located in an immediate vicinity of said first parking space and/or a detector for detecting presence of a customer who has placed an order in the vicinity of said first parking space; and a second 2-dimensional bar code visible from said second parking space comprising information identifying said order picking station and/or a second signalling element for signalling a request for delivery of an order located in an immediate vicinity of said second parking space and/or a detector for detecting presence of a customer having placed an order in the vicinity of said second parking space;

said order delivery management unit is configured so that when said first or said second two-dimensional bar code is scanned by a customer who has placed an order by using a dedicated application downloadable onto a terminal of said customer capable of transmitting a signal to said management unit comprising information identifying said order and said information identifying said order pick-up station contained in said first or said second bar code, or when a request for delivery of an order is notified by said first or said second signalling elements or when the presence of a customer having placed an order is detected in the vicinity of said first or said second parking space, said management unit generates instructions for controlling the activation of the collection, within said buffer storage facility, of the items of the notified order or of the order of the customer having scanned one of said bar codes or of the order of the customer having been detected in the vicinity of a parking space and instructions for controlling the routing of said items by said router to the picking station associated with said first bar code or with said second bar code having been scanned by said customer or associated with said first or said second signalling element having notified a request for delivery of the order of said customer, or associated with the access lane where the presence of said customer has been detected if said items are present within said buffer storage facility;

said first signalling element and/or said second signalling element comprises a terminal; and said pick-up point comprises, for each access and parking lane, a signalling element which signals a number of vehicles parked in said access and parking lane.

2. The system according to claim 1, wherein said first signalling element and said second signalling element are spaced from 5 to 10 metres apart.

3. The system according to claim 1, wherein said access and parking lanes are arranged in a herringbone pattern and form an angle of 30 to 50° with a service road of said pick-up point.

4. The system according to claim 1, wherein said first signalling element and/or said second signalling element comprises at least one signalling element belonging to the group consisting of:

bar code reader;
QR code reader;
magnetic strip or chip reader;
numerical keyboard for entering a code;
biometric identification reader.

5. The system according to claim 1, wherein said detector for detecting the presence of a customer having placed an order in the vicinity of said first parking space and/or said detector for detecting the presence of a customer having placed an order in the vicinity of said second parking space comprises at least one detection element belonging to the group consisting of:

presence sensor;
geolocation system;
license plate recognition device.

6. The system according to claim 1, characterised in that said signalling element which signals the number of vehicles parked in an access and parking lane comprises a traffic light.

7. The system according to claim 1, wherein, said stored items being delivered in bins to said picking stations, at least one of said picking stations comprises a transfer element which transfers empty bins to said automated router.

8. A method for automatically delivering orders ordered in-line near a trunk of a vehicle at a pick-up point having a plurality of order pick-up stations, each of which has an associated motor vehicle access and parking lane adjacent thereto, and each access lane comprises a first vehicle parking space and a second vehicle parking space, said second parking space being positioned behind said first parking space in said lane, said pick-up point being associated with:

an automated buffer storage facility for ordered items;

automated router which routes said stored items from said buffer storage facility to said picking stations; and an order delivery management unit configured to order collection of the ordered items of an order in said buffer storage facility and to control activation of the router for said items, wherein said pick-up point comprises, for each order pick-up station:

a first 2-dimensional bar code visible from said first parking space comprising information identifying said order picking station and/or a first signalling element for signalling a request for delivery of an order located in a immediate vicinity of said first parking space and/or a detector for detecting presence of a customer who has placed an order in the vicinity of said first parking space; and a second 2-dimensional bar code visible from said second parking location comprising information identifying said order picking station and/or a second order delivery request signalling element located in an immediate vicinity of said second parking space and/or a detector for detecting a presence of a customer having placed an order in the vicinity of said second parking space, said method comprising:

scanning by a customer having placed an order of said second two-dimensional bar code by using a dedicated application downloadable on a terminal of said customer able to transmit a signal to said management unit comprising an identification information of said order and said identification information of said order picking station contained in said second bar code or signalling a request for delivery of an order by using said second signalling element or detection of the presence of the customer in the vicinity of said second parking space;

from said scanning or signalling or said detection, generating by said management unit instructions to activate the collection, within said buffer storage facility, the items of the signalled order or of the order of the customer having scanned one of said bar codes or of the order of the customer having been detected in the vicinity of a parking space and instructions for controlling the routing of said items by said router to the picking station associated with said second bar code having been scanned by said customer or associated with said second signalling element having notified a request for delivery of the order of said customer or associated with the access lane where the presence of said customer has been detected;

scanning by the same customer of said first two-dimensional bar code by using said dedicated application downloadable on a terminal of said customer able to transmit a signal to said management unit comprising an identification information of said order and said identification information of said order picking station contained in said first bar code or signalling a request for delivery of the order of said customer by using said first signalling element or detection of the presence of the same customer in the vicinity of said first parking space; and delivery of the order items to said picking station associated with said first bar code having been scanned by said customer or associated with said first signalling element having signalled a request for delivery of the order of said customer or associated with the access lane where the presence of said customer has been detected, wherein:

said first signalling element and/or said second signalling element comprises a terminal; and said pick-up point comprises, for each access and parking lane, a signalling element which signals a number of vehicles parked in said access and parking lane.

9. The method according to claim 8, wherein said first signalling element and/or said second signalling element comprises at least one signalling element belonging to the group consisting of:

bar code reader;

QR code reader;

magnetic strip or chip reader;

numerical keyboard for entering a code;

biometric identification reader.

10. The method according to claim 8, characterised in that said signalling element which signals the number of vehicles parked in an access and parking lane comprises a traffic light.

11. The method according to claim 8, wherein, said stored items being delivered in bins to said picking stations, at least one of said picking stations comprises a transfer element which transfers empty bins to said automated router.

12. A system for automatic delivery of orders ordered in line near a trunk of a vehicle comprising:

a pick-up point having a plurality of order picking stations, each of which is associated with an access and parking lane for a motor vehicle, adjacent thereto;

an automated buffer storage facility of ordered items;

an automated router which routes said stored items from said buffer storage facility to said picking stations, an order delivery management unit configured to order collection of the ordered items of an order in said buffer storage facility and to control activation of the router, wherein each access lane comprises a first vehicle parking space and a second vehicle parking space, said second space being placed behind said first space in said lane, and wherein said pick-up point comprises, for each order picking station:

a first 2-dimensional bar code visible from said first parking space comprising information identifying said order picking station and/or a first signalling element for signalling a request for delivery of an order located in an immediate vicinity of said first parking space and/or a detector for detecting presence of a customer who has placed an order in the vicinity of said first parking space;

a second 2-dimensional bar code visible from said second parking space comprising information identifying said order picking station and/or a second signalling element for signalling a request for delivery of an order located in an immediate vicinity of said second parking space and/or a detector for detecting presence of a customer having placed an order in the vicinity of said second parking space, and wherein said order delivery management unit is configured so that when said first or said second two-dimensional bar code is scanned by a customer who has placed an order by using a dedicated application downloadable onto a terminal of said customer capable of transmitting a signal to said management unit comprising information identifying said order and said information identifying said order pick-up station contained in said first or said second bar code, or when a request for delivery of an order is notified by said first or said second signalling elements or when the presence of a customer having placed an order is detected in the vicinity of said first or said second parking space, said management unit generates instructions for controlling the activation of the collection, within said buffer storage facility, of the items of the notified order or of the order of the customer having scanned one of said bar codes or of the order of the customer having been detected in the vicinity of a parking space and instructions for controlling the routing of said items by said router to the picking station associated with said first bar code or with said second bar code having been scanned by said customer or associated with said first or said second signalling element having notified a request for delivery of the order of said customer, or associated with the access lane where the presence of said customer has been detected if said items are present within said buffer storage facility, wherein said first signalling element and/or said second signalling element comprises at least one signalling element belonging to the group consisting of:

bar code reader;

QR code reader;

magnetic strip or chip reader;

numerical keyboard for entering a code;

biometric identification reader, wherein said pick-up point comprises, for each access and parking lane, a signalling element which signals a number of vehicles parked in said access and parking lane.

13. The system according to claim 12, wherein said first signalling element and/or said second signalling element comprises a terminal.

14. The system according to claim 12, wherein said first signalling element and said second signalling element are spaced from 5 to 10 metres apart.

15. The system according to claim 12, wherein said access and parking lanes are arranged in a herringbone pattern and form an angle of 30 to 50° with a service road of said pick-up point.

16. The system according to claim 12, wherein said detector for detecting the presence of a customer having placed an order in the vicinity of said first parking space and/or said detector for detecting the presence of a customer having placed an order in the vicinity of said second parking space comprises at least one detection element belonging to the group consisting of:

presence sensor;

geolocation system;

license plate recognition device.

17. The system according to claim 12, characterised in that said signalling element which signals the number of vehicles parked in an access and parking lane comprises a traffic light.

18. The system according to claim 12, wherein, said stored items being delivered in bins to said picking stations, at least one of said picking stations comprises a transfer element which transfers empty bins to said automated router.

19. A method for automatically delivering orders ordered in-line near a trunk of a vehicle at a pick-up point having a plurality of order pick-up stations, each of which has an associated motor vehicle access and parking lane adjacent thereto, and each access lane comprises a first vehicle parking space and a second vehicle parking space, said second parking space being positioned behind said first parking space in said lane, said pick-up point being associated with:

an automated buffer storage facility for ordered items;

an automated router which routes said stored items from said buffer storage facility to said picking stations; and an order delivery management unit configured to order collection of the ordered items of an order in said buffer storage facility and to control activation of the router for said items, wherein said pick-up point comprises, for each order pick-up station:

a first 2-dimensional bar code visible from said first parking space comprising information identifying said order picking station and/or a first signalling element for signalling a request for delivery of an order located in a immediate vicinity of said first parking space and/or a detector for detecting presence of a customer who has placed an order in the vicinity of said first parking space; and a second 2-dimensional bar code visible from said second parking location comprising information identifying said order picking station and/or a second order delivery request signalling element located in an immediate vicinity of said second parking space and/or a detector for detecting a presence of a customer having placed an order in the vicinity of said second parking space, said method comprising:

scanning by a customer having placed an order of said second two-dimensional bar code by using a dedicated application downloadable on a terminal of said customer able to transmit a signal to said management unit comprising an identification information of said order and said identification information of said order picking station contained in said second bar code or signalling a request for delivery of an order by using said second signalling element or detection of the presence of the customer in the vicinity of said second parking space;

from said scanning or signalling or said detection, generating by said management unit instructions to activate the collection, within said buffer storage facility, the items of the signalled order or of the order of the customer having scanned one of said bar codes or of the order of the customer having been detected in the vicinity of a parking space and instructions for controlling the routing of said items by said router to the picking station associated with said second bar code having been scanned by said customer or associated with said second signalling element having notified a request for delivery of the order of said customer or associated with the access lane where the presence of said customer has been detected;

scanning by the same customer of said first two-dimensional bar code by using said dedicated application downloadable on a terminal of said customer able to transmit a signal to said management unit comprising an identification information of said order and said identification information of said order picking station contained in said first bar code or signalling a request for delivery of the order of said customer by using said first signalling element or detection of the presence of the same customer in the vicinity of said first parking space; and delivery of the order items to said picking station associated with said first bar code having been scanned by said customer or associated with said first signalling element having signalled a request for delivery of the order of said customer or associated with the access lane where the presence of said customer has been detected, wherein:

said first signalling element and/or said second signalling element comprises at least one signalling element belonging to the group consisting of:

a bar code reader;

a QR code reader;

a magnetic strip or chip reader;

a numerical keyboard for entering a code; and a biometric identification reader; and said pick-up point comprises, for each access and parking lane, a signalling element which signals a number of vehicles parked in said access and parking lane.

* * * * *